(12) United States Patent
Newman (10) Patent No.: US 7,452,561 B2
(45) Date of Patent: Nov. 18, 2008

(54) TREATMENT OF VEGETABLE FOODSTUFFS

(76) Inventor: Paul Bernard Newman, Northcole House, Northlew, Okehampton, Devon, EX20 3BT (GB)

( * ) Notice: Subject to any disclaimer, the term of this patent is extended or adjusted under 35 U.S.C. 154(b) by 277 days.

(21) Appl. No.: 10/430,374

(22) Filed: May 7, 2003

(65) Prior Publication Data
US 2004/0005390 A1 Jan. 8, 2004

(30) Foreign Application Priority Data
May 7, 2002 (GB) .................... 0210377.8

(51) Int. Cl.
*A23B 7/015* (2006.01)
(52) U.S. Cl. .................. 426/248; 426/320; 426/524
(58) Field of Classification Search ................ 426/237, 426/248, 312, 320, 524
See application file for complete search history.

(56) References Cited

U.S. PATENT DOCUMENTS

| | | | | | |
|---|---|---|---|---|---|
| 2,401,131 | A | * | 5/1946 | Bensel ....................... 426/234 |
| 3,506,452 | A | * | 4/1970 | Jett, Jr. et al. ............. 426/237 |
| 3,773,527 | A | * | 11/1973 | Ruggerone ................ 426/637 |
| 4,054,672 | A | * | 10/1977 | Inoue et al. ............... 426/244 |
| 4,871,559 | A | * | 10/1989 | Dunn et al. ................ 426/248 |
| 5,597,597 | A | * | 1/1997 | Newman ................... 426/248 |
| 5,607,711 | A | * | 3/1997 | Lagunas-Solar ........... 426/248 |
| 5,901,564 | A | * | 5/1999 | Comeau, II ................ 62/264 |
| 6,010,727 | A | * | 1/2000 | Rosenthal .................. 426/240 |
| 6,132,784 | A | * | 10/2000 | Brandt et al. .............. 426/248 |
| 6,165,526 | A | * | 12/2000 | Newman .................... 426/248 |
| 6,210,730 | B1 | * | 4/2001 | Mitchell .................... 426/312 |
| 6,730,923 | B1 | * | 5/2004 | May et al. ................. 250/494.1 |

FOREIGN PATENT DOCUMENTS

| | | | |
|---|---|---|---|
| EP | 164285 A | * | 12/1985 |
| GB | 2365749 A | * | 2/2002 |
| WO | WO 95/28846 | * | 11/1995 |
| WO | WO 01/89310 A1 | * | 11/2001 |
| WO | WO 02/085137 A1 | * | 10/2002 |

OTHER PUBLICATIONS

Postharvest Induction Modeling Method Using UV Irradiation Pulses for Obtaining Resveratrol-Enriched Table Grapes: A new "Functional" Fruit?, Emma Cantos , Juan Carlos Espin, and Francisco A. Tomas-Barberan, 2001, Journal of Agricultural and Food Chemistry, No. 49, pp. 5052-5058.*

* cited by examiner

*Primary Examiner*—Drew E Becker
(74) *Attorney, Agent, or Firm*—Stites & Harbison PLLC; Douglas E. Jackson (57) ABSTRACT

A fresh vegetable foodstuff such as fruit, vegetables, grains or nuts is treated to reduce microbial contamination (UV-C irradiation, preferably in a $CO_2$ atmosphere, preferably at −1 to +4° C.) and/or to induce protective phytoalexins (UV-A, UV-B and UV-C irradiation) and/or to destroy aflatoxins (UV irradiation, primarily UV-C). A modular system can be readily adapted to different foodstuffs. It can include treatment modules and support modules (e.g. for cleaning elements of the treatment modules, providing them with controlled environments, and controlling the input of foodstuffs so they are susceptible to treatment).

9 Claims, 3 Drawing Sheets

TREATMENT OF VEGETABLE FOODSTUFFS

FIELD OF THE INVENTION

This invention relates to a method or methods for preventing or reducing the development of microbial contamination and/or aflatoxin in stored fruits, vegetables, grains or nuts, or the elimination or reduction of microbial contamination and/or aflatoxin developed in or on fruits, vegetables, grains or nuts prior to processing. The associated methods are preferably derived from technology of modular form so that the same units can be used in different combinations and/or sequences to optimise the method for a specific product or a specific contamination and/or aflatoxin within or upon a specific product.

BACKGROUND TO INVENTION

Unlike many foodstuffs such as meat, fish and poultry which have a short shelflife primarily due to their high water content or high water activity and their elevated rate of deterioration except at very low holding temperatures, fruits, vegetables, grains and nuts are often harvested and held for many months prior to processing and conversion into finished food products. However very considerable amounts of stored foodstuffs are lost due to a) the action of microbial contamination during storage which cause a variety of rots and/or
b) the production of secondary toxic metabolites (aflatoxins) which are harmful to the health of both humans and animals and, once formed are difficult and/or expensive to remove.

The problem with the former is that they are directly caused by microbial contamination of the crop at harvest or at storage and remain undetected until the crop is removed from storage for processing into food materials and products or are resistant to attempts to remove it during the further processing stages of manufacturing. While stored crops are often held in modified atmospheres or forced air flows to make the atmospheric conditions and humidity levels less suited to microbial growth and consequent stored product deterioration, these approaches merely reduce the rate of spread of contamination and have little effect on the total level of contamination certainly from the incoming crop.

Aflatoxin contamination is a result of microbial infection, primarily fungal. Aflatoxins are metabolites of microbial growth and what makes them particularly dangerous is that once generated they remain accumulated in the fruit, nut, grain or vegetable long after any signs of the original infection may have disappeared. They cause a range of carcinogenic disease in both humans and animals including liver cancer, heart failure and renal damage at concentrations as low as 20-30 ug/kg. (The range of aflatoxins causing aflatoxicosis and the systems and mechanisms of action have been extensively studied; the reader is directed to Urbanek (1997) for a more detailed explanation).

Another problem with microbial contamination and subsequent aflatoxin formation is that it is extremely variable. Infections may be very localised so that one fruit or nut may have a very heavy contamination while adjacent fruits may have little or none. A number of attempts have been made to develop rapid methods for identifying contaminated product. The most widely used of these are fluorescence techniques. It has been known for several decades (Shotwell et al, 1972) that on exposure to certain wavelengths of longwave UltraViolet (350 nm to 400 nm) different aflatoxins fluoresce different colours. The so-called B aflatoxins (primarily B1 and B2) fluoresce blue while the so-called G aflatoxins (primarily G1 and G2) fluoresce green. Further metabolised variants of the B aflatoxins, found almost exclusively in milk and milk products, are the so-called M aflatoxins (M1 and M2) fluoresce a mauve blue colour. Although to date some 17 compounds have been designated as aflatoxins, the descriptive term aflatoxin is principally used to describe the 4 furocoumarin metabolites B1, B2, G1, G2 and the two milk variants M1 and M2.

However the fluorescence technique is far from foolproof and false positives and variable performance both between and within different crop groups are a major problem. For example, while Steiner et al, 1988 found that removing all fluorescing figs from a 56 Kg batch reduced the original aflatoxin contamination level from 22.6 to 0.3 ppb, Waked, 1984 found that in cotton seed 92% of fluorescing seeds contained aflatoxin while 8% of non-fluorescing seeds also contained aflatoxin. Similarly, Shotwell et al, 1975 found that after removing all fluorescing kernels and particles from batches of sweetcorn, cracking the corn and then re-inspecting with longwave UV revealed a further 19% of the crop had levels of aflatoxin greater than 3 ppb.

Several patents for detection of aflatoxin in crop specific product have been granted, however they all appear to use the same basic principle of illumination using long wavelength UV combined with manual or automated identification and isolation of fluorescing material. Typical of this is U.S. Pat. No. 4,535,248 used for detecting aflatoxin in almonds. Again while they undoubtedly cause a reduction in total crop aflatoxin levels they do not eliminate it and further expensive remedial action is often necessary before the product is safe to release into the human food chain. Also, these methods are crop specific and practical application is restricted to only a few of them.

Although making a significant improvement to the detection of contaminated harvested crops, the technique is variable in performance and far from reproducible. To this end, manufacturers and further processors have tended to rely on chemical measurement techniques to establish/confirm the cleanness of the manufactured product. Accurate batch sampling of large volumes of incoming material is notoriously difficult to do, is expensive and time consuming and no way guarantees that the product will emerge from the manufacturing process in an aflatoxin free condition. This therefore causes still further expense and delay while the finished product is similarly re-analyzed. Should any contaminated product be discovered at this stage (pathogen or aflatoxin), it necessitates further expensive reprocessing to inactivate the aflatoxin.

Numerous attempts have been made to introduce routine decontamination and/or detoxification techniques as part of the manufacturing process; these may be chemical or physical in nature or a combination of both. However such techniques are either very expensive and only warranted for that part of the crop which could be designed as premium product and thus generate sufficient margin to make its further processing cost effective or they cause the partial degradation of the product quality and thus depress the selling capability or they are only partially effective.

Examples of such techniques include the use of Ozone without Ultraviolet, U.S. Pat. No. 6,294,211, Ozone with short wave UV, Ultrasound, U.S. Pat. No. 5,498,431. U.S. Pat. No. 6,294,211 contains an extensive reference of patents using Ozone either in isolation or in addition with other components to achieve this decontamination effect while U.S. Pat. No. 6,171,625 lists an extensive reference of patented intellectual property utilizing a range of physical and chemical processes used for aflatoxin detoxification including heating, proprionic acid, sodium hydroxide, Fullers earth, aluminosilicate-based clays, ammonia and ammonium compounds. While most are carried out under normal atmospheric conditions, some are under vacuum. Chapman in U.S. Pat. No. 5,082,679 describes and cites numerous techniques for detoxification in an aqueous medium including ammonium compounds and methylamine, and reference is made to all three patents. However most of these treatments can or do have effects on the foodstuff which leads to a reduction in some measure of their quality attributes usually due to either oxidative and/or hydrolytic reactions within or upon the surface of the foodstuff.

An alternative approach has been the use of physical media such as pulsed light in conjunction with photosensitisers such as riboflavin or isoalloxazine (Hlavinka, 2001, Doyle et al 1982).The inactivation of the pathogen occurs by interfering with replication but this does not inactivate the aflatoxin and, as has been shown elsewhere with other pathogens such as *E. coli*, rupture of the pathogenic organism may lead to an excessive release of toxin and a resultant more acute toxicosis.

Radiant energies have also been used. These may be non-irradiating sources such as Infra-red, visible light and Ultraviolet or irradiating sources such as gamma rays and all have been shown in isolation to be partially capable of reducing overall microbial pathogenicity but with only minimal or nil effect on aflatoxin levels (Van Dyke et al, 1982). Nagarj et al (1985) reduced aflatoxin levels by 16% through sun drying. Muench and Stein (1986) showed that storing cotton seed with high voltage electrical discharge eliminated aflatoxin formation, principally as a consequence of inhibiting the growth of the causative organism. W. German Patent 1 914 095 describes a method of reducing aflatoxin levels in peanuts by exposing them to wet steam followed by a cold water spray in the presence of ultrasound.

Aflatoxins are very heat stable and can withstand boiling (>100° C. for 3 hours). They can be detoxified in alkaline solutions but are relatively stable in neutral and acid pH. However even in neutral solutions the presence of strong oxidisers such as bisulphites, hypochlorites or peroxides will lead to aflatoxin degradation. Unfortunately this usually only occurs in reasonable time (2 hours) at elevated temperatures of 40° C. or greater at additive concentrations of 1% or greater. British Patent 1 117 573 showed that aflatoxin in peanut could be eliminated by exposure to hydrogen peroxide at a pH of 9.5 or greater. Commonly used fumigants showed no detoxification capabilities (Brekke and Stringfellow, 1978)

Another drawback to effective treatment using such additives is that it frequently requires the foodstuff to have either an elevated moisture content or a high water activity for significant detoxification to occur. Rasic et al (1990) reported a significant detoxification in the presence of acids such as lactic and acetic and Magella and Hafez (1982) showed a similar effect with fermenting yoghurt. However Manabe and Matsuura (1972) reported that although B1 and G1 aflatoxins were 50% decomposed during early stages of miso fermentation, B2 and G2 were unaffected.

Altug et al (1990) reported that 45% of B1 aflatoxin in aqueous phase was degraded within 30 minutes when exposed to a low energy source of UV-C but that neither the presence of bisulphite nor peroxide enhanced this degradation. Nkama and Muller (1988) exposed rice to different natural light intensities and moisture contents at 40° C. Both had an effect on the rate of degradation but there was no apparent synergism. Shantha et al (1978) showed that aflatoxin in ground nut oil can be more effectively destroyed by exposure to sunlight than longwave UV or visible light (from a tungsten lamp). Yousef and Marth (1986) demonstrated that milk containing M1 aflatoxin when exposed to UV energy (254 nm) for 20 mins at 25° C. degraded 61% of that toxin. However the addition of 0.05% hydrogen peroxide increased this degradation to 90%. Bencze and Kiermeier (1972) showed that exposing aflatoxin in solid phase to UV-C (254 nm) irradiation induced varying degrees of aflatoxin inactivation with G1 and B1 but not G2 and B2 aflatoxin. In all cases the effect was directly dependent on the amount of available oxygen.

Maeba et al (1988) showed that B1 and G1 were easily degraded in the presence of 1 mg Ozone/1 within 5 mins at 20° C. while B2 and G2 required 40× more Ozone and a minimum of 60 mins exposure for the same level of detoxification.

An alternative approach to a curative treatment to contamination and possible aflatoxin production is a preventative one. A number of authors have identified naturally occurring and potentially protective components in certain foodstuffs (phytoalexins) which can protect and/or inhibit the initial contamination or limit its development. Most of these compounds are somewhat similar in structure to the aflatoxins being in the general group called isocoumarins. Their existence has been shown for example by Jeandet et al (1995) in grapes, Mercier et al (1993) in carrots and Rodov et al (1992) in some citrus fruits. These and others have investigated the effect of UV-C (principally 254 nm but ranging from 220 nm-280 nm) exposure to the level of phytoalexin production. Overall, the response has been negligible in intact fruits and vegetables, mature fruits and nil at low temperatures. More positive results were generally found after wounding or at the sites of infection but again no phytoalexin response could be induced by UV-C irradiation either with or without incidence of wounding at temperatures below 4° C.

Using the broader range of Ultraviolet exposures incorporating wavelengths, wavelength distributions, energy intensities and the associated physical operating conditions as detailed, we have been able to initiate high levels of natural phytoalexins in all of the listed foodstuffs tested. This has been irrespective of age or physical status including the absence of wounding and/or at low temperatures. We have further demonstrated a generalized protective response which has resulted in very low or nil foodstuff losses due to subsequent infection. We have also been able to demonstrate a corresponding resultant increase in maintained quality attributes and extended shelf-life.

This effect has not been demonstrated with any other physical energy, indeed Maghrabi and el-Sayed (1988) and Schmidt et al (1985) have positively demonstrated that irradiation techniques actually reduce the protective response in several crops.

The highest financial returns are most frequently obtained for natural, often organic, products which are in an uncooked state and therefore not exposed to any 'kill steps' during harvest, storage or processing to reduce or eliminate pathogens and/or reduce or eliminate aflatoxins. As a consequence, it is often essential that such products are processed in a dry or low moisture environment and not subjected to wet processes or chemical techniques that introduce or utilise compounds not considered natural, i.e. not normally associated with the product in its normal environment. Nor can they be subjected to thermal energy which would change their composition, state or appearance.

Finally, for any process to be considered practical and effective, it must be able to address either or both issues, pathogens and aflatoxins in either a preventative and/or curative manner specific for that product.

Thus there is an increasing need for a preventative method of decontaminating and/or detoxifying large volumes of fruits, vegetables, grains and nuts both before long term storage in an effort to minimize microbially-induced losses due to denaturation and decomposition and a further need for a combined preventative and curative step to eliminate existing and potential further contamination and aflatoxin accumulations in those materials during their further processing following harvest and storage.

This invention addresses both issues and provides a generic and modular approach which can be adapted and optimised for use with a very wide range of fruits, vegetables, grains and nuts.

SUMMARY OF THE INVENTION

This invention relates to a method or methods for preventing or reducing the development of microbial contamination and/or aflatoxin in stored fruits, vegetables, grains or nuts, or the elimination or reduction of microbial contamination and/or aflatoxin developed in or on fruits, vegetables, grains or nuts prior to processing. The associated method steps may be performed apparatus in modular form so that the same units can be used in different combinations and/or sequences to optimise the method for a specific product or a specific contamination and/or aflatoxin within or upon a specific product.

DETAILED DESCRIPTION

Before we describe the individual modules, we will describe the principles behind the invention.

1. Elimination or Reduction in the Numbers of Pathogenic or Spoilage Organisms

It is well known that shortwave UV-C is capable of reducing microbial numbers usually by forming thiamine dimers which inhibit or prevent DNA replication. A typical application using this principle is described in U.S. Pat. No. 5,597,597.

It is further known that most food contaminations occur on or very close to the natural surfaces of the foodstuff or are generated on or near the surfaces of foodstuffs undergoing processing as a consequence of the action of manufacturing processes themselves, such as peeling, cutting, slicing or cubing, on the foodstuff. The effectiveness of the action of the shortwave UV-C can be enhanced by changing the physical conditions particularly pH.

Most spoilage micro-organisms exist optimally on these foodstuffs between pH 5.0 and pH 8.0. We have found that by exposing the organisms to a modified atmosphere, preferentially one containing at least 70% $CO_2$ just before and/or during the exposure to shortwave UV, the effectiveness of the treatment is greatly enhanced. It has also been shown, as in U.S. Pat. No. 6,165,526 that increasing the temperature of the high water content or high water activity foodstuffs just prior to and/or during the decontamination treatment improves the effectiveness of UV decontamination. We have found that exposing fruits, vegetables, grains and nuts not to a heating treatment but to a cooling treatment by exposing it to a stream of refrigerated air or modified atmosphere so that the surfaces at least are at 4° C. or less (but not so low as to degrade the quality of the foodstuff and certainly not below −1° C.), the effectiveness of the decontamination treatment is further enhanced.

All of the previously described decontamination technologies are of a curative nature, i.e. they are concerned with reducing or eliminating microbial contamination after it has formed. An alternative approach is a preventative one and while this has equal application for both harvested, stored and further processed product, the most dramatic benefits have been demonstrated in the treatment of harvested product going into store.

We have clearly demonstrated with a range of fruits, vegetables, grains and nuts including but not limited to Apple, Bananas, Beans, Carrot, Celery, Grape, Grapefruit, Kumquat, Lemon, Lime, Orange, Parsnip, Peach, Pear, Peas, Peppers, Potato, Soybean, Sweet Potato, Tomato, that exposing product to UV wavelengths, particularly a combination of germicidal wavelengths of UV-C as well as UV-A and UV-B wavelengths, at the time of storage can significantly reduce total losses due to microbial infections, damage and quality deterioration. We have been able to demonstrate that the effect is through two separate modes of action and the combined effect is synergistic.

The first is the already described reduction in total microbial numbers through inactivation of DNA replication and other related actions which prevent the organisms from either germinating, and/or growing and/or replicating.

The second is through the initiation of a natural defensive action within the fruit. It is known that with the groups of products previously mentioned, a family of compounds, Phytoalexins (primarily coumarins and their related or associated compounds), generate a protective action within the foodstuff as a result of wound infection. Examples of Fruits and Vegetables that release protective Phytoalexins on exposure to UV wavelengths described include (but are not limited to) Apple, Bananas, Beans, Carrot, Celery, Grape, Grapefruit, Kumquat, Lemon, Lime, Orange Parsnip, Peach, Pear, Peas, Peppers, Potato, Soybean, Sweet Potato, Tomato.

Normally these protective compounds are found at very low or nil levels in intact or product not showing signs of damage or wounding. At the site of damage or wound, levels of these compounds, up to 30 times that found in undamaged material are frequently found and it has been further demonstrated by others that these compounds display highly potent microcidal or microstatic properties.

What we have been able to demonstrate is that exposure of harvested product to specific wavelengths of the UV spectrum detailed results in substantially higher levels of these natural phytoalexins occurring in intact fruit (up to 100× that normally found in intact fruit) particularly at the external surfaces and very high levels in damaged fruit (up to 800× that normally found in intact fruit) particularly in the immediate vicinity of the sites of damage. We have been further able to demonstrate that foodstuff treated in such a manner shows substantially improved resistance to microbial contamination in storage (up to 100% in some cases) compared with untreated foodstuff and where microbial contamination has been artificially induced after UV treatment, the extent of any resultant contamination has been substantially or totally prevented compared with similarly infected untreated product. Exposure of the same foodstuffs to UV-C wavelengths alone produces smaller increases in phytoalexins compared with the UV broadband exposure (22%-36% of that produced by UV broadband exposure)

Exposure of the same foodstuffs to UV wavelengths excluding that of UV-C (using lamps as detailed in section 2 below) produces only 15%-28% of the phytoalexins concentration compared with the UV broadband exposure.

We have further been able to demonstrate a similar effect on further processed product particularly fruits, vegetables and nuts subjected to cutting, dicing and slicing. However in this instance (and probably as a consequence of the intense tissue damage generated at the processed surface sites), the effect has been almost equal in the presence of UV-C alone or with the broadband UV exposure such that the shelf-life of such products is significantly extended, the level of microbially induced decomposition is substantially reduced and because of a reduction in the number and type of spoilage organisms, better quality products are produced and maintained due to a reduction or absence of biochemical reactions causing a loss of texture, and/or flavor and/or aroma.

2. Reduction or Elimination of Aflatoxin

It is known that sunlight is capable of significantly reducing aflatoxin levels in liquid media but its performance in solid media is much lower and variable. It is also known that visible light and longwave UV (UV-A) have some capability to detoxify in liquid media but there no evidence of similar activity in solid media.

It is further known that shortwave UV (UV-C) is also capable of partial degradation of aflatoxin but all the published evidence shows that this occurs only to the aflatoxin when in liquid media.

Our own experimentation has further shown that, neither Xenon lamps (which are commonly used in the film and photographic industry because they emulate natural daylight but have a much higher near Infra-red component), nor lamps which emit solely in the InfraRed spectrum, have any measurable effect on either decontamination or detoxification except that which may be induced due to an increase of surface and/or internal temperature of the foodstuff.

It is therefore most likely that Infra-red wavelengths and visible light wavelengths play only a minor role in detoxifying contaminated product and a similar role in decontaminating product except where, in combination with other wavelengths, they may induce or accelerate biochemical reactions involved in detoxification, principally oxidation and hydrolytic reactions.

However we have discovered that when using medium pressure Mercury vapour discharge lamps, particularly those which emit UV energy in the UV-A (320 nm-400 nm) range, UV-B (270 nm-320 nm) range and UV-C (less than 270 nm) under the conditions detailed herein, we are able to rapidly reduce overall toxin concentrations by 95% or more of their initial concentration. The detoxification capability appears to be prevalent in all medium pressure mercury vapour discharge lamps which have significant UV-A and UV-B components in addition to UV-C. However the UV-C component alone appears to be the principal wavelength component involved in decontamination properties.

Furthermore we find that the treatment has similar effect on all 4 major aflatoxin compounds. Under the defined conditions the effect is curvilinear with the 95% reduction being achieved in 30 seconds of exposure or less and 90% of the remaining activity taking a similar time period to become inactivated.

We are aware that the lamps and lamp configurations we use also generate small amounts of Ozone. However the levels produced are very low and we have demonstrated that because of the refrigerated air cooling system used around the lamps (to keep them within optimum performance conditions), the fact that the lamps themselves are physically separated from the foodstuff both by quartz glass sheets and the enclosures within which they operate, none of the produced Ozone comes in contact with the foodstuffs or the atmosphere around the foodstuff.

While the presence of the modified atmosphere has a proven effect on rates and effectiveness of product decontamination, we have been able to show that the rate and level of aflatoxin detoxification is not significantly different whether it occurs in normal air or a modified atmosphere. As far as we can ascertain, this is the first time that effective aflatoxin control has been obtained through the use of multiple wavelengths of ultraviolet light; it is also the first time it has been shown to be effective in solid media. It is also the first time that such a rate of detoxification has been shown in the absence of any strong oxidising agent or additive to alter product pH. The effect is also independent of water activity status.

3. Reduction or Elimination of Sources of Cross Contamination or Re-Contamination.

In any operation which processes large volumes of agricultural or horticultural foodstuffs, there is a very high volume of dirt, sand, damaged or decaying produce and other highly contaminated physical detritus in close contact with the foodstuff to be processed. While this is accepted as a normal component of harvested produce and to a lesser extent (as a result of physical methods of removing it such as washing or sifting) in bulk storage of such products, it is highly undesirable in further processing operations. As such foodstuffs are easier to handle and deteriorate slower when kept with essentially dry surfaces, it is essential that the processing environment particularly the atmosphere surrounding the foodstuffs and the mechanisms used to carry them through the various stages of the processing operation, such as conveyors are eliminated as potential sources of cross-contamination and recontamination.

Microbial spores, mycelia, cells and other potential sources of contamination can be physically removed by air filtration systems. The effectiveness of such systems can be further enhanced by ensuring that all incoming air/modified atmospheres are subjected to a further exposure of UV-C sufficient to inactivate such growth potential.

The conveying surfaces, which may be surfaces of conventional conveyors, vibrating conveyors, augers or other suitable mechanisms, are also subjected to a suitable cleaning cycle which may be any combination of the following: dry brushing, wet brushing, high pressure air, high pressure water, low pressure water with or without a suitable detergent (or any other suitable cleaning cycle). To further enhance the efficiency of the cleaning cycle, the conveyoring surface is exposed, following cleaning but before coming into contact with further new product, to sufficient UV-C so as to render it sterile or essentially so.

4. Maintenance of Optimum Processing Conditions

A number of physical components of the system environment need to be controlled to ensure that both processing conditions and product conditions remain optimum.

a) Temperature

We have demonstrated that both decontamination and detoxification actions of the system work optimally when the vegetable, fruit or nut foodstuffs are subjected to a cooling treatment by exposure to a stream of refrigerated air or modified atmosphere so that the surfaces at least are at 3° C. or less (but not so low as to degrade the quality of the foodstuff and certainly not below −1° C.) during the decontamination and/or detoxification treatments. This also appears to maintain the foodstuff in a better quality controlled condition compared with foodstuffs of this type treated at room temperature or elevated temperatures.

b) Atmosphere

We have further demonstrated that microbial decontamination of these types of foodstuffs (from both pathogenic and spoilage) is most effective when the surfaces are at a reduced pH and/or in a reduced oxygen environment. It is preferentially undertaken in an atmosphere of at least 70% CO2, ideally 100% CO2.

We have shown that effective detoxification of such foodstuffs can equally occur in both unmodified air or a modified atmosphere of a type previously described.

c) Oxidation Reactions

The decontamination treatment appears to be essentially achieved by the UV-C component of the light energy. We have shown that UV-C has minimal penetrative capabilities into these foodstuffs (by measuring the total amount of oxidation products at various depths under the surface of the foodstuff and the changes in any naturally occurring anti-oxidant compounds within the foodstuff) and thus only the surfaces need to be essentially devoid of oxygen. In the presence of the preferred CO2 modified atmosphere such oxidation reactions are significantly reduced.

The detoxification treatment appears to require at least some oxygen. However the amounts of oxygen normally found present with the interior structures of the foodstuffs are usually sufficient as undertaking the treatments in an atmosphere devoid of oxygen does not appear to be a limiting factor. The various components of the UV spectrum have different penetrative capabilities with UV-A having the greatest and UV-C, the least. By selective utilisation of lamps of different UV energy distributions we have shown that all components appear to play some role in the detoxification process. Use of the combination of lamps produces a significant synergism.

d) Dry Environment

Foodstuffs of these types maintain their quality best when allowed to maintain their normal levels of moisture and water activity. Elevated humidities (together with elevated temperatures and catalysts of oxidation reactions) adversely affect product quality.

We have shown that maintaining low humidities during the decontamination and detoxification processes, preferably 30% RH or lower, further reduces the rate of oxidative and hydrolytic reactions and better maintains original product quality. However although preferred, it is not essential for effective decontamination and/or detoxification.

5. Product Separation and Equality of Treatment/Exposure.

The success, effectiveness and efficiency of the treatment process has been shown to be directly related to both product thickness and product separation during the treatment process.

The decontamination process requires that the light energy is able to strike all surfaces of the product and for a defined minimum period (which is at least dependant upon the microorganisms requiring to be reduced or removed and the energy levels available for their treatment).

The detoxification process also requires a minimum defined amount of energy to penetrate the product (again this is specifically defined by the product itself and those parts of the foodstuff known to preferentially contain or retain the aflatoxin and the time of exposure available within the treatment process).

We have been able to demonstrate that it is essential that all product is effectively exposed to the decontamination and/or detoxification treatments in a mono-layer, i.e. a single thickness of product. We have also been able to demonstrate that the efficiency of treatments is further improved by ensuring that all surfaces of each foodstuff are able to receive the minimum required treatment dose.

We have further shown that treatment effects are significantly more effective and repeatable if each surface of the foodstuff is exposed for a few long continuous periods rather than many short periods. For example, exposure of almonds for *E. coli* decontamination purposes was shown to be at least 10 times more effective when the almonds were exposed to a single 40 second exposure per surface compared with 10 sequential 4 second exposures per surface.

The required degree of separation can be achieved by self-levelling conveyors, vibrating conveyors, controlled input, gravity feed, manual or automatic placement techniques or any method suitable for the product to be treated. Whatever method chosen must of course be capable of handling the capacity and throughput of product required while ensuring the calculated or actual minimum exposure period is maintained.

6. Optimised Processing Control

We have demonstrated that it is advantageous for the successful implementation of these technologies and the generation of effective and reproducible methodologies to use extensive monitoring and control of the individual modules of the system and the maintenance of the system parameters within the necessary very tightly controlled ranges to ensure effective treatment.

This has been achieved in preferred embodiments through the introduction of technology capable of measuring and monitoring system components including but not limited to a) light energies and distribution (light meters sensitive to each wavelength)
b) process and product temperatures, (thermocouples and thermistors)
c) atmosphere composition, (gas analysers)
d) effective removal of physical debris and biomass, (biomass sensing principally through UV-A and UV-B fluorescence monitoring)
e) effective decontamination and control of conveyoring surfaces and the surrounding atmosphere (monitoring of cleaning systems)
f) control of product placement before and during treatment, (manual observation and/or image or sensing technology)
g) measurement and control of material flows (load cells and other weigh and/or volume and/or flow sensors)
h) product monitoring (manual or instrumental processing such as image analysis).
i) total process control (integrated PC or PLC based system/process controller)

The necessary instrumentation to measure each attribute has been introduced and although performance can be maintained within an acceptable range through manual observation measurement and control, we have shown that for optimum performance the automated measurement and control system always outperforms the manually controlled system by a wide margin.

We have already described the mechanisms by means of which the decontamination and detoxification properties are imparted in the stated foodstuffs. We will now describe sufficient of the essential components of the individual modules such that someone who is skilled in the art would be able emulate our discoveries and invention.

Module A—to Reduce or Remove Pathogenic Micro-Organisms or Micro-Organisms Capable of Inducing Decay or Rot or Other Deterioration of Stored or Processed Product.

This unit comprises a series of low pressure, high output shortwave UV lamps (BL type MSC0040 or equivalent) generally placed at a distance of between 1 cm and 100 cms from the product to be treated, typically 15 cms-30 cms. The lamps can be any practical length from 30 cms to 180 cms, typically 120 cms in length. They are placed in parallel with the product in an orientation that causes the product to run parallel with the longest axis of the lamps.

For product with a thickness dimension greater than 15 cms, the lamps are placed in an arc such that the lamps at the arc remain parallel or almost parallel with the curvature of the edge of the product thus ensuring an even distribution of energy to the curved surfaces. The dimensions of the arc are optimised relative to the thickness dimension of the product being treated.

The number of lamps and the total energy output are variable with the specific requirements of the product. For example we have shown that for the same dwell time it requires approximately twice the energy to decontaminate a wide variety of foodstuffs of Salmonella contamination compared with similar levels of $E.\ coli$ contamination. However the number chosen is equivalent to at least 150% of the calculated amount of energy needed (in Joules at 254 nm equivalents) to produce the desired level of decontamination within the dwell time available for treatment. However, total energy output in the range of 5 -30W/m2 will generally achieve the required level of decontamination.

If the required amount of energy and exposure time cannot be achieved using low pressure lamps alone, they may be replaced by, in whole or in part, or supplemented with, in whole or in part, medium pressure mercury lamps (BL type MSC0042 or equivalent) with a shortwave UV-C energy output sufficient to achieve the desired level of decontamination.

Module B—to Detoxify Formed Aflatoxin within Fruits, Vegetables, Nuts and Grains This module is essentially the same dimensions and configuration as that used for decontamination with the except of the lamp type. The lamp type used is a mercury fluorescent type capable of producing UV energy in all three wavelengths, UV-C, UV-B and UV-A (BL type MSC0041 or equivalent). All 3 wavelengths have been shown to contribute to the detoxification of aflatoxin but ideally the peak energy output in the UV-B range should be greater than that of the UV-C and the combined UV-A and UV-B output should be at least 50% of the total UV energy output in all UV wavelengths, generally in the range 20-60W/m2. The total energy output of the lamps and the configuration and number of those lamps needs to be sufficient to achieve the desired level of detoxification in the selected product. This will obviously depend on many factors the most important being the volume of product to be treated, the time available to treat that volume of product, the initial level of aflatoxin within the product and the desired level of detoxification. Quite obviously the size and configuration of a system to detoxify 25000 Kgs of almonds per hour will be quite different from one needed to detoxify 5000 Kgs of sweetcorn.

Module C—for Inducing a Protective Phytoalexin Response in Stored Product.

This module is essentially a combination of modules described in a) and b) above. However the total amount of energy needed to induce the required protective response is substantially less than that necessary for detoxification applications and broadly similar to that required for decontamination (5-30W/m2). As has been previously detailed, medium pressure lamps of this type may produce wavelengths outside that of the UltraViolet range, for example in the visible range (420 nm-700 nm) and/or in the InfraRed (longer than 700 nm). However these wavelengths are not essential for the detoxification process to successfully occur. The energy distribution for optimum effect needs to be equivalent to that used for detoxification, thus the number of lamps needed is a combination of both types sufficient to produce the required effect within the specified foodstuff.

Module D—to Minimise or Eliminate Cross-Contamination or Recontamination

This module provides the system conveyoring surfaces with a mechanism to remove surface detritus, dirt, debris and any accumulated biofilms such that when each surface is presented to receive product from the previous module, it is clean and effectively sterile.

The form and function of such cleaning and sterilisation will vary from product to product. For example the conveying surfaces of a system treating a relatively dry product such as almonds does not require an extensive wet cleaning regime. Thus a low pressure wash and brush followed by a sterilisation step such as exposure to shortwave germicidal UV-C has been shown to be sufficient. However the conveying surfaces of a system treating product, such as carrot or potato, with a much higher water content and with a higher level of natural physical detritus and accompanying soil debris requires a more extensive regime including a high pressure wash or low pressure wash and brush, frequently with a cleaning solution suitable to remove accumulated biomass, a rinse and a more intense exposure to germicidal UV-C to ensure and maintain a sufficiently rigorous cleaning and sterilisation regime. A typical suitable apparatus to achieve this is detailed in European Patent application 1206198 modified to function within the configuration of the decontamination and/or detoxification system described.

Module E—to Maintain Optimum Processing Conditions and Minimal Product Deterioration.

A number of system physical parameters have to be controlled so that the system can maintain optimum processing conditions while at the same time minimising any undesirable changes in the product undergoing treatment. Some modifications to the physical conditions within which the treatments are undertaken, have already been discussed with regard to the manner in which they synergistically improve the effectiveness and performance of the decontamination and/or detoxification treatments. The following are modifications necessary to minimise, prevent or eliminate conditions which might lead to the possible deterioration in the physical or chemical status of the foodstuff as a result of the treatment if they are not incorporated.

The use of UV wavelengths of the type previously described, particularly when produced from medium pressure mercury lamps, generates excessive amounts of heat (typically 50% or more of the total energy output). It is essential to preserve the native state of the foodstuff unchanged. It is therefore essential that sufficient refrigerated air is circulated within the system to ensure that any temperature increase of the treated product, particularly on its exposed surfaces, are constrained so that no physical or chemical changes occur on or in the product leading to a deterioration in the product or produce any perceivable changes in its condition from that of the untreated product.

Again this temperature requirement is variable and highly dependant on the nature of the product. For example, products such as peppers and tomatoes darken following exposure to UV light. However if the exposure is undertaken while the surface of the product remains below 10° C., this effect is largely eliminated. Similarly products such as cauliflowers and bananas also darken on exposure to UV light. However if the temperature is kept below 6° C. and after treatment the product is immediately packed so that it remains hidden from visible light, no such darkening occurs. Almonds, other nuts and other fruits, grains and vegetables with a high level of natural anti-oxidant need much less rigorously controlled temperature requirements with temperatures in excess of 40° C. at the surface not resulting in any detectable deterioration in the physical or chemical state of the product.

With all foodstuffs tested, we have found that if the treatment is undertaken so that the temperature at the surfaces remains at or below 2° C., no deterioration is detected in any foodstuff.

Ultraviolet light of all wavelengths is capable of inducing oxidation reactions within foodstuffs. UV-C is a very strong inducer of such oxidising reactions. We have shown that the occurrence of such reactions is minimised or eliminated by modifying the atmosphere within which the reaction occurs. Where the product has a low moisture content or low water activity, replacing the normal air atmosphere with an inert one such as nitrogen or carbon dioxide, or some combination of these or other inert gases, is not necessary. However it has been found that where such product is to be packaged and stored in a modified atmosphere, introducing it prior to or at the inception of the treatment and maintaining it throughout the processing operation to the point of packaging dramatically, improves packaging rates in conventional modified atmosphere packaging systems by eliminating the need for the oxygen removal (flushing) cycle prior to packaging. There is a measurable small but variable improvement (depending on the foodstuff treated) in product quality compared with product treated without the modified atmosphere.

However, where the product has a high moisture content or high water activity, replacing the normal air atmosphere with an inert one such as nitrogen or carbon dioxide, or some combination of these or other inert gases, is highly desirable. The preferred atmosphere is one of at least 70% CO2, ideally up to 100%. With such products, the CO2 dissolves in the moisture at the product surfaces and changes the pH to more acidic values. This lowered pH diffuses to the tissues immediately below the surface. The effect is two-fold.

Firstly, most microbial spoilage organisms exist and grow optimally between pH5.5 to 8.0, reducing the pH reduces their rate of growth. We have shown that it also makes them significantly more susceptible to the decontamination treatment than if the same treatment is undertaken without the modification to the atmosphere.

Secondly reducing the amount of available oxygen at the surfaces at the time of exposure to the UV sources, reduces or inhibits oxidation reactions occurring. We have shown through various measurements such as amount of chlorophyll breakdown (celery, lettuce), levels of free fatty acids or TBA breakdown products (beans, peas, carrot, cauliflower) or reduction in levels of natural anti-oxidants (oranges, limes, almonds, peppers), that treating product within the modified atmosphere produces insignificant changes in any of the indicators of oxidation compared with untreated product. In the absence of the modified atmosphere, these oxidation indicators are very significantly higher. However the rate and amount of oxidation that occurs varies both between foodstuffs and treatment conditions. In all instances reducing any induced oxidation reactions has been shown to significantly extend product shelf-life.

The third processing condition that needs to be controlled is humidity. While the magnitude of the effect is significantly less than that derived from control of temperature and/or processing atmosphere, it is nonetheless measurable and advantageous. Therefore it is desirable, where practicable, to maintain the humidity of the atmosphere of the treatment apparatus to 30% or less.

Module F—to Generate Spacing between Foodstuffs and Ensure Evenness of Treatment We have shown that even if all other conditions are met, the treatment will be less effective and more variable if proper spacing and placement of foodstuff is not induced and maintained. UV wavelengths of light have poor penetrative capabilities with the ability to penetrate decreasing with decreasing wavelength of UV light. The decontamination treatment is only effective on exposed product surfaces and immediately (1 mm or so) below them. The induction of preventative phytoalexins again is a surface effect, particularly at the sites of damage, wounds or infections of the foodstuff.

The detoxification effect occurs throughout the foodstuff and thus needs to penetrate into the product up to 2 cms depending on individual foodstuff dimensions. The preventative protective (phytoalexin response) effect appears to occur at an intermediate depth between the two.

To achieve these various effects in a practical configuration, the foodstuff is introduced into the system in a manner which generates the necessary individual component separation. This will vary by foodstuff type but for example, potatoes, tomatoes and peppers can be introduced in a single layer through the use of a roller or cup conveyor; nut and grain type products such as sweetcorn though a vibrating conveyor or a conventional conveyor with a number of self levelling devices such as that detailed in U.S. Pat. No. 5,597,597 or a combination of both while others of uneven and variable dimension may first be separated by a flotation technique before being introduced through a suitable conveyoring mechanism with or without an accompanying drying step (such as forced air or infra-red heating) to increase the effectiveness of the decontamination or detoxification treatment.

EXAMPLE 1

Figure 1A:
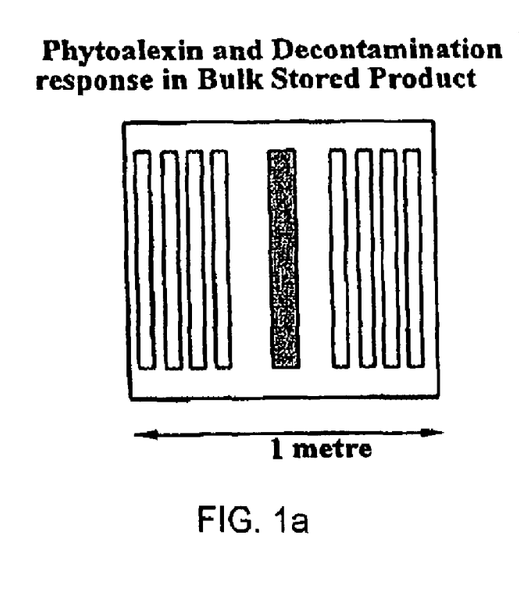
FIGS. 1a-1c show three different preferred lamp configurations in accordance with the present invention.
Figures 1B, 1C:
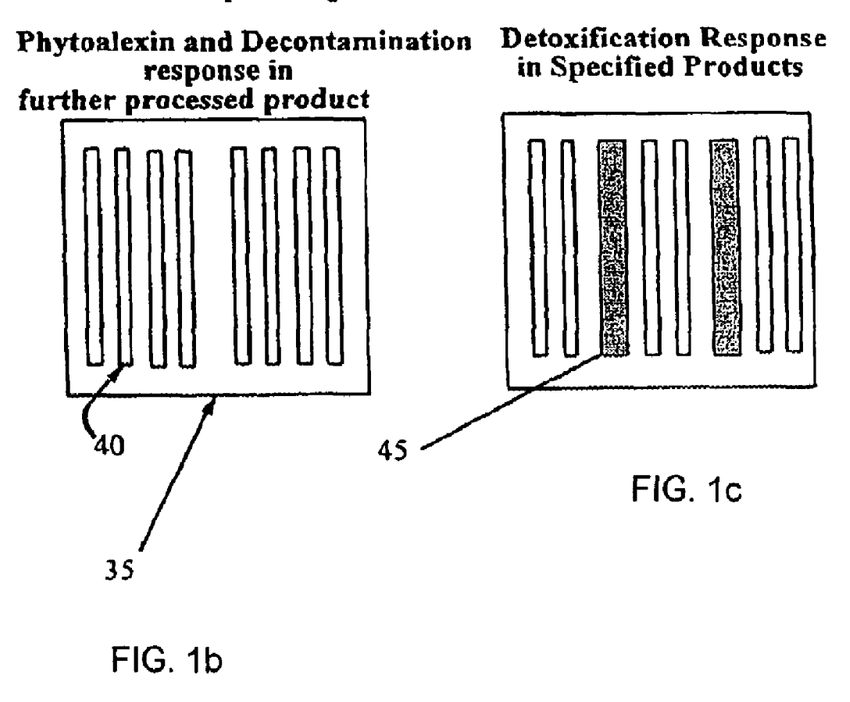
Figure 2:
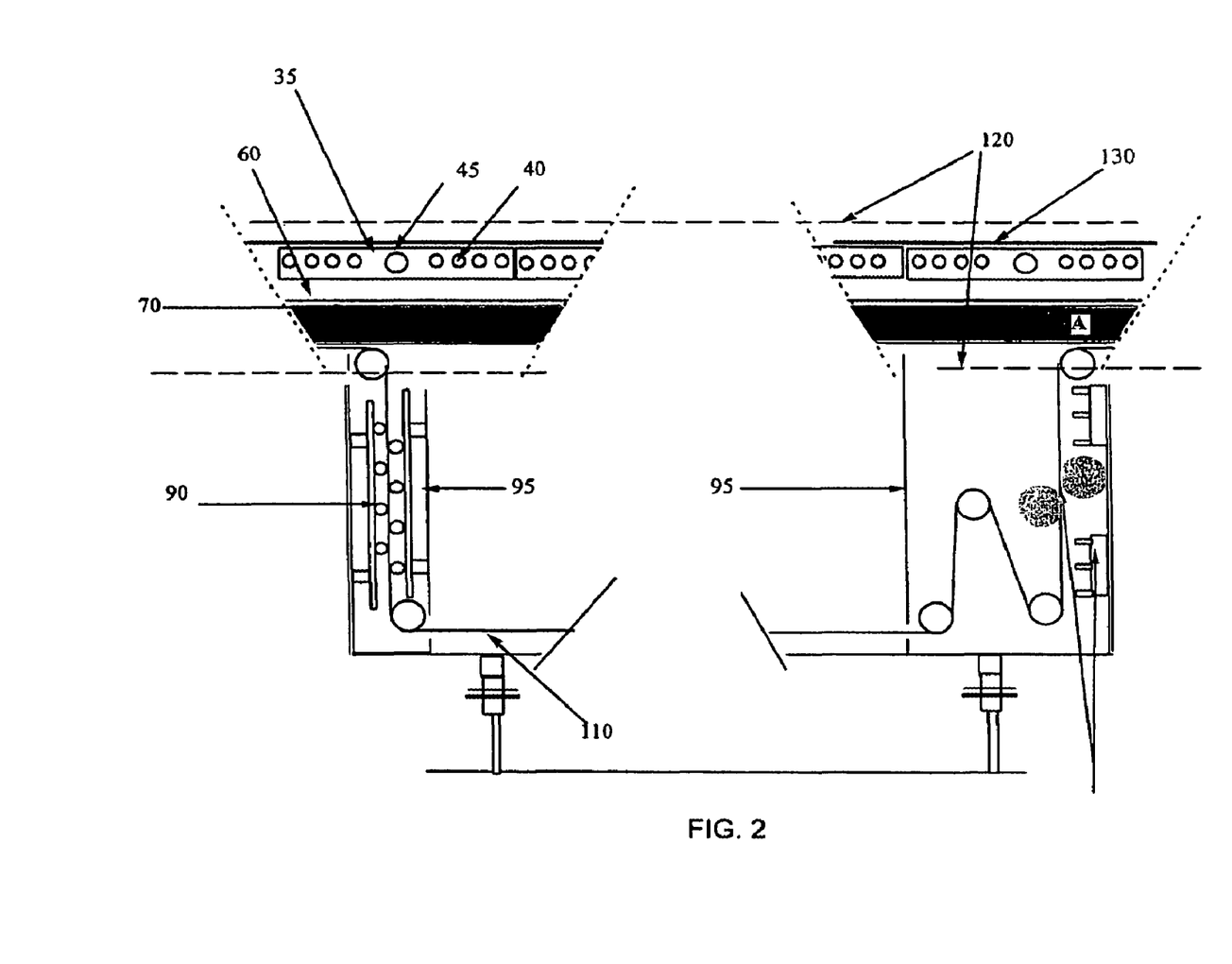
FIG. 2 is an apparatus for treating food items in accordance with the present invention.

Method and Apparatus for Decontaminating Product and Inducing the Preventative Phytoalexin Response in Tomatoes, Potatoes, Peppers or Similar Bulk Product The apparatus for achieving this is a combination of all 6 modules previously described and is shown in FIG. 2 utilising one of the lamp configurations shown in FIG. 1, typically as shown in 1a or 1b.

Tomatoes, freshly harvested or previously bulk stored, are introduced into the entrance to the system via a rolling conveyor. The distance between the individual rollers on a single roller shaft and between adjacent rollers is adjustable but sufficient to allow a tight packing of the tomatoes without any sides of adjacent tomatoes touching. Ideally there should be a gap (60) of between 6 mm (for Cherry or Bryan tomatoes) and 20 mm (for potatoes, large tomatoes and full size peppers) all round. For optimal performance, these dimensions may need adjustment depending on the size and size variation of the fruit.

The forward movement of the roller conveyor causes each tomato to slowly rotate such that each surface receives a minimum of 30 seconds continuous exposure. Also as the tomatoes move forward the movement of each roller conveyor is such that it also induces a small (50 mm-75 mm total) of lateral movement which in turn causes the tomato to also move laterally about its own axis ensuring an even treatment of all surfaces.

Alternatively the tomatoes may be fed on to a continuously moving conveyor bed comprising a metal or plastic mesh sufficient in area to hold the tomato in place in a fixed position for the same minimum 30 seconds of exposure. Small changes in the height of the conveyor at fixed locations along its length will cause the tomato to roll presenting a new surface to the treatment thus again ensuring the even treatment required. Such an arrangement is preferable for potatoes.

The lamps (40 or 40 and 45) within the housing (35) are positioned above the conveyor mechanism (70) and comprise sufficient of the low pressure short wave UV-C lamps (40) (type BL-MSC0040 or equivalent) or a combination of low pressure lamps and medium pressure broad spectrum UV wavelength lamps (45) (type BL-MSC0041 or equivalent) to produce a total energy output of between 10W/m2 and 30W/m2 and a total cumulative exposure of at least 300 J/m2 and typically between 300-1200 J/m2.

Because tomato skins are sensitive to temperatures in excess of 35° C. (they form localised blistering and darkening/burning of the outer skin of the fruit) it is essential to maintain the surfaces of the tomatoes below 30° C. This is achieved by passing the fruits through the treatment tunnel but exposing the fruits on their underside to a current of cool air typically at a temperature of 5° C.-10° C. (130). If necessary the air on the upper surfaces can also be similarly refrigerated. However care needs to be taken to ensure the lamps are not excessively cooled by any air flow as this will seriously impair their efficiency and correspondingly the effectiveness of the treatment.

The conveying bed in contact with the initially uncleaned tomatoes is subjected to a continuous cleaning and sterilising program every rotation. Any dry dirt or debris is removed by either a stream of compressed air, or through physical brushing (100). The stream of air used in conjunction with the brushing can be heated (110) especially if the dirt is moist and adhering to the bed of the conveyor. The bed is also subjected to a minimum 5-10 second exposure of shortwave UV-C (90) (using typically a configuration of 4 to 10 lamps of the type BL-MSC0040) within a protective cabinet (95) to ensure the exposed conveyor bed surface is sterilised prior to receiving a fresh batch of product for treatment.

For product such as potato where physical detritus is more adhesive and carbohydrate and starch debris is more abundant than with products such as tomatoes and peppers, the cleaning cycle will probably need to include a wet wash either, brushless using a medium/high pressure jet wash or, a low pressure wash in combination with a brush cleaning system; either can be used with or without a cleaning agent and/or with or without a water rinse, the actual configuration (at 100) will depend entirely upon the specific product and treatment operation.

The whole treatment operation is undertaken within a controlled atmosphere (120). For product destined to be placed in store for long term this is likely to be at least 70% CO2 as previously described. If for an immediate further processing and preparation operation, the atmosphere is modified to suit the composition of the final packaged product.

TABLE 1

Effect of Phytoalexin response in Commercial Tomatoes

Treatment 1
Freshly Harvested Whole Tomatoes
Chlorine Wash, 5 day Store,
30 second broadband UV light treatment
14 day further Store
Losses (%)  Wash Only   81%  Wash + Light  12%
Treatment 2
Freshly Harvested Whole Tomatoes
No Chlorine Wash,
30 second broadband UV light treatment
20 day Store
Losses (%)  Untreated   100%  Treated  NIL %
Treatment 3
Freshly Harvested Whole Tomatoes
Chlorine Wash, 5 day Store,
30 second light treatment
14 day further Store
Losses (%)  Broadband UV     8%   UV-C only   31%
            UV-B/UV-A only  74%
            Xenon only      93%
            Infra-Red only  88%
            Untreated       94%
Treatment 4
Freshly Harvested Whole Tomatoes
No Chlorine Wash,
30 second light treatment
20 day Store
Losses (%)  Broadband UV    0.3%   UV-C only   14%
            UV-B/UV-A only  69%
            Xenon only     100%
            Infra-Red only 100%
            Untreated      100%

EXAMPLE 2

Aflatoxin Removal in Maize and Sweetcorn

In comparison with example 1, aflatoxin removal requires a much simpler but very specific configuration (FIG. 1c). In this instance lamps emitting essentially UV-C wavelengths alone are generally ineffective particularly when mixed aflaxtoxin contamination is encountered and only lamps capable of emitting all 3 UV wavelengths (as previously described and typified by BL-MSC0041) produce the desired detoxification and the required effectiveness. However lamps emitting primarily UV-C alone are included in the configuration to enhance the microbial decontamination treatment which is allowed to occur in parallel with the detoxification treatment.

The major difference compared with phytoalexin induction is the very substantial increase in the energy level required to achieve effective aflatoxin detoxification as the toxin is frequently widely distributed within the total volume of the product.

The lamps are positioned at a typical distance of 10-50 mm above the conveying mechanism (60) and comprise sufficient of the medium pressure broad spectrum UV wavelength lamps (Mercury Vapour discharge lamp type BL-MS0041 or equivalent) to produce a total energy output of between 30W/m2 and 120W/m2 and a total cumulative exposure of at least 300 J/m2 and typically between 300-1200 J/m2. (Using 4 units of the lamp configuration shown in FIG. 1c, such an exposure is achieved within 45 seconds and is therefore capable of treating up to 1500 kg of separated maize or sweet corn kernels per hour or up to 5000 Kg of whole maize or sweet corn cobs.

TABLE 2

| Effect of Time/Energy Output on Residual Afloatoxin In Sweetcorn | | | | | | |
|---|---|---|---|---|---|---|
| | | Time (in seconds) | | | | |
| 0 | 10 | 20 | 30 | 40 | 50 | 60 |
| | | Residual Aflatoxin (%) | | | | |
| 100 | 68 | 41 | 27 | 15 | 4 | 0.1 |

Total Aflatoxin (mean) 439 ppb

Obviously increasing the number of lamp units will enable a faster throughput. For example, a module containing 5 of the 8 lamp configuration (FIG. 1*c*) positioned 25 mm above the conveyor generating a mean energy output of 67W/m2 and an exposure time of 50 seconds has been shown to be capable of almost completely detoxifying 10000 Kgs of almonds per hour (Table 3)

TABLE 3

| Effect of Exposure Time/Energy Output on Residual Aflatoxin In Almonds | | | |
|---|---|---|---|
| Exposure (in seconds) | 0 | 15 | 60 |
| Residual Aflatoxin | | | |
| B1 (ppb) 140 | 11 | 0.2 | |
| B1 (%) | 100 | 7.9 | 0.1 |
| Other Aflatoxins | | | |
| B2/G1/G2 (ppb) | 29 | 20.6 | 0.1 |
| B2/G1/G2 (%) | 100 | 71.1 | 0.05 |

Total B1 Aflatoxin (mean) - 140 ppb
Total Other Aflatoxins (mean) - 29 ppb

An alternative lamp type (BL-MSC0043 or equivalent) which produces no shortwave UV but higher overall levels of UV-B and UV-A can be used. However the total exposure time needed to be increased by between 34%-72% to achieve the same level of detoxification depending on the overall concentration of aflatoxin and its % component distribution.

Nuts and grains of these types produced considerable dust during the treatment period and required that conveying surfaces were cleaned and using the module D for eliminating recontamination as detailed in Example 1. A wet clean was only needed approximately once every 2 hours. The accumulated dust also caused the lamps to gradually lose efficiency (as measured by total energy output) and lamps were subjected to a moist clean every 8 hours.

In addition the lamps used generate considerable amounts of heat and, although nuts and grains are significantly more tolerant of elevated temperatures than many fruits and vegetables, refrigerated air at 5° C. as generated within module E is required. It is circulated within the system confines (130) in sufficient volume to prevent the surface of the nuts and grains rising above 25° C. By passing this circulated refrigerated air through a dry filtration system, significant amounts of dust can be removed from the system reducing cleaning frequency.

Where the maize or sweet corn was in the form of whole cobs, the necessary spacing was generated within module F in one of two ways. Either the conveyor was a roller conveyor of the type previously described in example 1 and the in-feed entrance was restricted in height so that the sweet corn cobs could only enter single thickness. Or the conveyor bed was a fixed grid bar configuration comprising 2 mm interlocking bars running the width of the conveyor with 20-40 mm gaps between adjacent bars. The cobs were firmly held within the gaps between the bars. Fresh surfaces were exposed to the treatment lights by effecting a change in the conveyor bed height by passing over one set of feed rollers of 25-40 mm diameter and under another of similar dimension so as to cause a drop in the conveyor bed height of 50 mm-80 mm, resulting in the individual cob tumbling about its axis and repositioning on the bed exposing a fresh surface to the treatment.

Where the maize or sweet corn was in the form of separated kernels, the necessary separation and optimum product thickness was accomplished by in-feeding the product through one or more vibrating conveyors. The product then passed forward on to a solid or grided conveyor bed of interlocking metal or plastic bands of suitable dimensions sufficient to retain the product in the desired configuration for treatment. While these configurations were determined as optimum for the products as tested, any suitable separating mechanism can be used, providing the necessary product spacing and thickness can be achieved. This treatment has been shown to be equally effective for a variety of product containing aflatoxin including but not limited to sweet corn, maize, almonds, peanuts, ground nuts, figs, wheat and other cereal grains.

EXAMPLE 3

Decontaminating Tomatoes and its Associated Processing and Packaging Equipment to Effect Slicing and Packaging within an Aseptic Environment while Inducing a Synergistic Protective Phytoalexin Response Example 1 has detailed how a variety of foodstuffs can be protected from contamination during storage through a combined protective (induction of a Phytoalexin response) and curative (microbial decontamination) method. Eventually such stored product is introduced into a manufacturing environment for processing into food and food products for consumption. The manufacturing process introduces considerable potential for contamination and cross contamination of these prepared foodstuffs due to non-sterile processing equipment, common contact surfaces, packaging materials and the atmosphere within which it operates.

The same protective reaction and a more thorough curative method can be applied and induced during such manufacturing operations but using conditions less likely to cause a deterioration in finished product quality. A typical further processing manufacturing operation for fruit & vegetable products is as follows.

Tomatoes from store or freshly harvested enter into the manufacturing operation. As a first step they may be washed in chlorine, or ozonated water or other suitable disinfecting solutions. However if washed, they must be air dried before further processing to ensure effective and reproducible treatment.

They are automatically or manually loaded on to a suitable conveyor for in-feed into an automatic slicer (such as the Model TS-1500 Precise Slice™, Bock Engineered Products, Toledo, Ohio, which is used as an example and detailed in FIG. 3). Before entering the slicer itself, the tomatoes (220) are exposed to UV-C energy of a similar type as described in example 1 but in a different (FIG. 1*b*). The conveying mechanisms (70) which carry the product through the process in the desired spacing and optimal configuration are similar to, but not limited to, those previously described as Module F. In this instance, a guide rail (260) assists in retaining the tomatoes in the desired configuration. The conveying surfaces are subjected to continuous cleaning and sterilisation using a method and configuration (90, 100, 110) as detailed in Module D and example 1.

Figure 3:
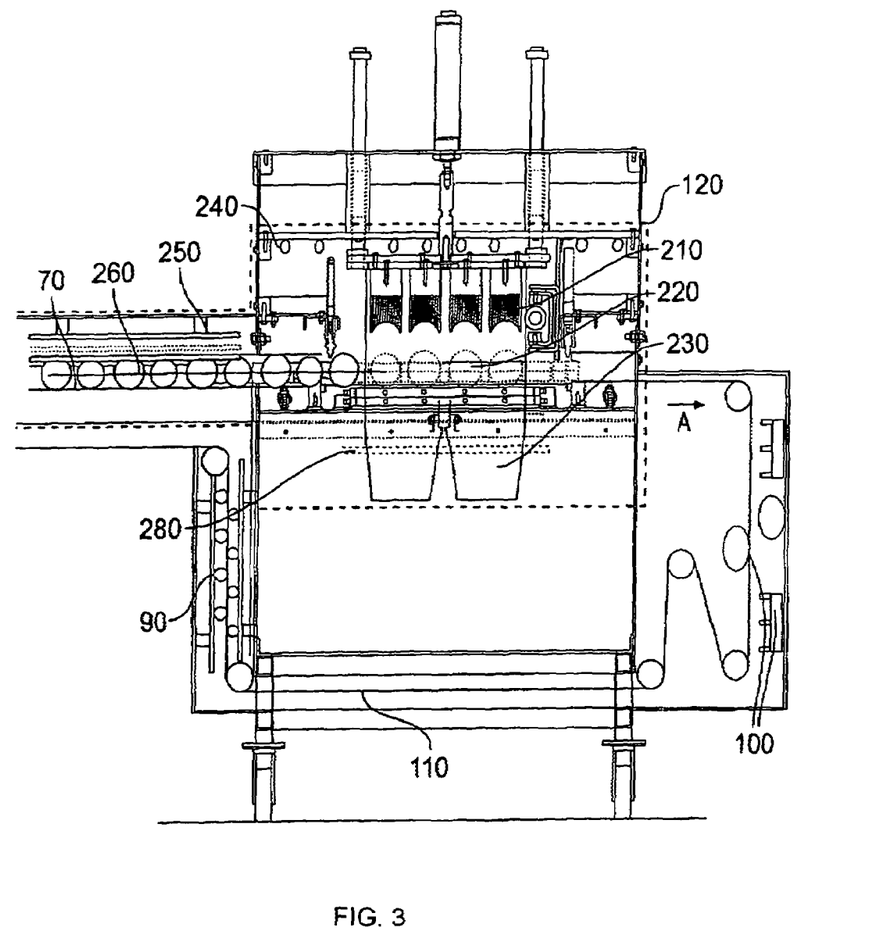
FIG. 3 is an automatic slicer in accordance with the present invention.

The same lamp type is also present within the body of the slicing system such that each shift prior to commencement of manufacturing operations, all equipment surfaces, which come into contact with the foodstuff, are subjected to a minimum of 2 minutes and preferably 5 minutes of UV energy exposure (240). This effectively sterilises all the working and food contact surfaces. The UV-C energy is continuously output during manufacturing operations such that food-contacting surfaces are continuously re-sterilised between processing operations as is the foodstuff.

The trays and other containers (230), which are to receive the foodstuff, are similarly treated with the UV-energy (280) of similar type and magnitude. However in this instance, effective treatment can be obtained by a minimum of 5 seconds, and preferably 10 seconds, exposure.

Once the product is sliced or completed its further processing operation, which may include selective removal of product components such as end slices, cores or similar unwanted materials, it is received into its sterilised containers and passes to the completion of the packaging operation which, preferentially, should be situated immediately adjacent to and continuous with the processing equipment. Ideally final packaging should be completed under the same atmosphere composition and processing conditions as the manufacturing operations.

We have found that, because of the extensive damage generated by cutting, slicing, dicing and similar operations, the maximum level of both protective and curative response can be produced from a single lamp type (such as BL-MSC0040 or similar). This has several advantages over that needed for product going into store. It simplifies the circuitry to drive the lamps and generates very little heat minimising the need to refrigerate the operating atmosphere. It also significantly reduces potential for product quality deterioration due to high energy level exposure and/or elevated operating temperatures and it allows manufacturing operations to take place within a very small footprint, significantly reducing costs.

However we have found that, particularly with fruits and vegetables such as onion, tomatoes, peppers, pineapple, orange, etc., prepared for consumption without any further processing or preparation such as in fast food products and ready to eat foods, undertaking all the processing and packaging operations within an inert atmosphere, preferably one containing at least 70% $CO_2$, more preferably 100% $CO_2$, enhances the shelf-life and maintains the quality of the foodstuff compared with those undertaken in normal air and very significantly with those not treated by these methodologies during processing and packaging operations, Table 4).

Similarly, we have found that refrigerating to 2° C. or less during processing produces the optimum effect in terms of residual microbial numbers, product quality and extended shelf-life.

We have also found that such treatment also generates an enhanced protective response through the combined effect of an aseptic operating environment resulting in very low levels of product contamination or recontamination. At the same time, a substantial phytoalexin response, similar to that already described in Example 1, also occurs. This has the additional benefit of reducing the ability for residual organism to grow and multiply within the packaged environment of the finished processed product.

TABLE 4

Effect of Slicing and Packaging of Tomatoes in Various Treatments

| Treatment & Atmosphere | Microbial Counts (cfu/g) Before Processing | 1 day after Packing | Mean Shelf Life (in days) |
| --- | --- | --- | --- |
| None Air | $1.8 * 10^3$ | $2.0 * 10^4$ | 5-6 days |
| Wash Only Air | $4.9 * 10^2$ | $6.9 * 10^3$ | 6-8 days |
| Wash & Treated Air | $1.5 * 10^2$ | $8.8 * 10^2$ | 9-11 days |
| Treated Only Air | $2.0 * 10^1$ | $4.6 * 10^2$ | 11-14 days |
| None 100% $CO_2$ | $1.8 * 10^3$ | $9.2 * 10^3$ | 6-7 days |
| Wash Only 100% $CO_2$ | $4.9 * 10^2$ | $4.3 * 10^3$ | 7-9 days |
| Wash & Treated 100% $CO_2$ | $1.5 * 10^2$ | $3.7 * 10^2$ | 11-14 days |
| Treated Only 100% $CO_2$ | $2.0 * 10^1$ | $8.2 * 10^1$ | 15-17 days |

REFERENCES CITED

The following is a list of references cited throughout this disclosure with their respective complete citation.

PATENTS

British Patent 1 117 573, CSIR, January 1968
Eur. Pat. Appl 206 198, Newman February 2002
U.S. Pat. No. 4,535,248, Schade et al, August 1985
U.S. Pat. No. 5,082,679, Chapman, June 1994
U.S. Pat. No. 5,498,431, Linder, March 1996
U.S. Pat. No. 5,597,597, Newman, November 1997
U.S. Pat. No. 6,165,526, Newman, February 2000
U.S. Pat. No. 6,171,625, Denvir et al, January 2001
U.S. Pat. No. 6,294,211, Yuan et al, September 2001
U.S. patent application No. 2002/001 5662, Hlavinka February 2002
W. German Patent 1 914 095, Hanssen and Bahlsen, December 1970

OTHER REFERENCES

T. Altug, A. E. Yousef and E. H. Marth, 'Degradation of Aflatoxin B1 in dried figs by sodium bisulphite'. Journal of Food Protection, 53 (7) 581-582, (1990)
K. Bencze and F. Kiermeier, 'UV Irradiation of aflatoxins in solid phase' Zeitchrift fur Lebensmittel, 148 (5), 279-285, (1972)
O. L. Brekke and A. C. Stringfellow, 'Aflatoxin in corn: a note on ineffectiveness of several fumigants as inactivating agents', Cereal Chemistry, 55 (4) 518-520, (1978)
M. P. Doyle et al, 'Physical, chemical and biological degradation of mycotoxins in foods and agricultural commodities', Journal of Food Protection, 45 (10) 964-971, (1982).
P. Jeandet, M. Sbaghi, R. Bessis and P. Meunier, 'The potential relationship of resveratrol synthesis to anthocyanin in grape skins'. Vitis, 34 (2), 91-94, (1995.
H. Maeba et al., 'Destruction and detoxification of aflatoxins with ozone', Journal of Food Science, 53 (2), 667-668, (1988)

S. E. Magella and A. H. Hafez, 'Detoxification of aflatoxin B1 by acidogenous yoghurt', Mycopathologica, 77 (2) 89-91, (1982)

Y. M. Maghrabi and S. A. el-Sayed, 'Storage stability in gamma-irradiated potatoes for sprout inhibition in relation to phytoalexin formation. Annals of Agricultural Science, Ain Shams Univ, 33 (1) 423-433, (1988)

M. Manabe and S. Matsuura, 'Degradation of added aflatoxin during miso fermentation', Journal of Food Science and Technology (Japan) 19 (6), 275-279, (1972)

J. Mercier, J. Arul and C. Julien, 'Effect of UV-C on phytoalexin accumulation and resistance to B. cinerea in stored carrots'. Journal of Phytopathology, 139 (1), 17-25, (1993)

E. W. Muench and W. Stein, 'Aflatoxin removal from feed and food—presentation of a new procedure', Fett-Wissenschaft-Technologie, 88 (9) 367-371, (1986)

G. Nagarj and K Kailash, 'Detoxification of aflatoxins in groundnut', Journal of Oil Technologists, India, 17 (2) 40 (1985)

J. L. Rasic, M. Skrinjar and S. Markov, 'Detoxification of aflatoxin B1 by yoghurt, lactic and acetic acids', Food Biotechnology, 4 (1) 608, (1990)

V. Rodov et al., 'Ultraviolet illunination induces scoparone production in kumquat and orange'. Journal of American Society for Horticultural Science, 117 (5), 788-792, (1992)

K. Schmidt, D. I. Langerak and M. van Duren, 'Effect of Irradiation and/or heat treatment on the phytoalexin accumulation in potato tubers'. Zeitschrift fur Lebensmittel Forschung, 180 (5), 369-372, (1985)

T. Shanta and V. Sreenivasamurthy, 'Photo-destruction of aflatoxin in groundnut oil', in Fats and Oils in Food Products and their preparation, pp103-105, Symposium, Food Research Institute, Mysore, India(1978)

O. L. Shotwell et al, 'Aflatoxin occurrence in some white corn' Cereal Chemistry, 52 (5) 670-677, (1975)

O. L. Shotwell, M. L. Golden and C. W. Hesseltine, 'Aflatoxin Contamination: Association with foreign material and characteristic fluorescence in damaged corn kernals', Cereal Chemistry, 49:458-465, (1972)

W. E. Steiner, R. H. Rieker and R Battaglia, 'Aflatoxin contamination in dried figs, distribution and association with fluorescence' Journal of Agricultural and Food Chemistry, 36 (1) 88-91, (1988)

R. Urbanek, 'Syntheses and mechanistic studies of the potent Mycotoxin Aflatoxin B1, Organic Seminar Abstract, Univ. pp1-6, March 1997

P. J. Van Dyke, P. Tobback and M. Feys, 'Sensitivity of aflatoxin B1 to ionising radiation', Applied and Environmental Microbiology, 43 (6) 1317-1319. (1982).

M. Y. Waked, 'The relationship of infection depth to aflatoxin content in cottonseeds infected with *Apergillus flavus*', Mededelingen-Rijksuniversiteit-Gent, 49 (3 b), 1257-1262, (1984)

A. E. Yousef and E. H. Marth, 'Use of ultraviolet energy to degrade aflatoxin M1 in raw or heated milk with and without peroxide', Journal of Dairy Science, 69 (9), 2243-2247, (1986)

The invention claimed is:

1. A method for treatment of a raw vegetable foodstuff selected from fruits, vegetables, grains and nuts, so as (a) to reduce microbial contamination, (b) to reduce aflatoxin content, and (c) to cause the raw vegetable foodstuff to generate phytoalexins, said method comprising exposing the raw vegetable foodstuff to UV radiation in a wavelength range comprising at least a portion of each one of the UV-A, UV-B and UV-C radiation bands, wherein exposing the raw vegetable foodstuff to the UV radiation is carried out in an atmosphere of at least 70% of V/V of carbon dioxide.

2. The method according to claim 1, wherein the vegetable foodstuff is selected from the group consisting of apples, bananas, beans, carrots, celery, grapes, grapefruits, kumquats, lemons, limes, oranges, parsnips, peaches, pears, peas, peppers, potatoes, soybeans, sweet potatoes and tomatoes.

3. The method according to claim 1, wherein the vegetable foodstuff is disposed in a monolayer for treatment.

4. The method according to claim 1, wherein the vegetable foodstuff consists of a multiplicity of discrete elements and is treated so that all surfaces of all elements are irradiated.

5. A method for treatment of a raw vegetable foodstuff selected from fruits, vegetables, grains and nuts, so as (a) to reduce microbial contamination, (b) to reduce aflatoxin content, and (c) to cause the raw vegetable foodstuff to generate phytoalexins, said method comprising exposing the raw vegetable foodstuff to UV radiation in a wavelength range comprising at least a portion of each one of the UV-A, UV-B and UV-C radiation bands, wherein the foodstuff is subjected to a cooling treatment such that the surfaces of the foodstuff are maintained in the temperature range $-1$ to $+4°$ C. while exposing the raw vegetable foodstuff to the UV radiation.

6. The method according to claim 5, wherein exposing the raw vegetable foodstuff to the UV radiation is carried out in an atmosphere of at least 70% V/V of carbon dioxide.

7. The method according to claim 5, wherein the vegetable foodstuff is selected from the group consisting of apples, bananas, beans, carrots, celery, grapes, grapefruits, kumquats, lemons, limes, oranges, parsnips, peaches, pears, peas, peppers, potatoes, soybeans, sweet potatoes and tomatoes.

8. A method according to claim 5, wherein the vegetable foodstuff is disposed in a monolayer for treatment.

9. A method according to claim 5, wherein the vegetable foodstuff consists of a multiplicity of discrete elements and is treated so that all surfaces of all elements are irradiated.

* * * * *